United States Patent
Stats et al.

(10) Patent No.: US 6,237,320 B1
(45) Date of Patent: May 29, 2001

(54) REMOVAL OF INERT GASES FROM PROCESS GASES PRIOR TO COMPRESSION IN A GAS TURBINE OR COMBINED CYCLE POWER PLANT

(75) Inventors: David Andrew Stats, Clifton Park; Hans Peter Luessen; Ashok K. Anand, both of Niskayuna; Michael Jandrisevits, Clifton Park, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/260,025

(22) Filed: Mar. 2, 1999

Related U.S. Application Data

(62) Division of application No. 08/932,885, filed on Sep. 17, 1997.

(51) Int. Cl.$^7$ ............................................. F02K 3/22
(52) U.S. Cl. .............................................. 60/39.02
(58) Field of Search ........................... 60/39.02, 39.07, 60/39.12, 39.464, 39.465, 39.182

(56) References Cited

U.S. PATENT DOCUMENTS

| | | |
|---|---|---|
| 3,853,498 | 12/1974 | Bailie . |
| 3,868,817 | 3/1975 | Marion et al. . |
| 3,930,367 | 1/1976 | Gasparoli . |
| 4,199,327 | 4/1980 | Hempill et al. . |
| 4,202,167 | 5/1980 | Suggitt et al. . |
| 4,285,917 | 8/1981 | Knight . |
| 4,524,581 | 6/1985 | Cascone et al. . |
| 4,631,915 | 12/1986 | Frewer et al. . |
| 5,104,419 | 4/1992 | Funk . |
| 5,268,019 | 12/1993 | Rathbone . |
| 5,517,818 | 5/1996 | Leithner . |
| 5,666,801 | * 9/1997 | Rohrer ............................ 60/39.12 |
| 5,682,737 | 11/1997 | Schmidli . |

FOREIGN PATENT DOCUMENTS 2 442 216   6/1980   (FR) .

* cited by examiner

Primary Examiner—Ted Kim
(74) Attorney, Agent, or Firm—Nixon & Vanderhye

(57) ABSTRACT

In a method of operating a gas turbine wherein process by-product gases (e.g. from a blast furnace) are used as fuel in the gas turbine, an improvement which includes the steps of a) removing inert gases from the process gas to thereby form an enriched process gas; b) raising the enriched process gas to a minimum pressure sufficient for combustion in the gas turbine, and c) feeding the enriched process gas to the gas turbine for combustion. The invention also relates to a combined cycle plant including a gas turbine; a process system which supplies by-product gas to be used as fuel in the gas turbine; a gas enrichment station for removing inert gas prior to, or part-way through, compression of the enriched process gas; a gas clean-up station located upstream or downstream of the gas enrichment station; and, optionally, a heat recovery steam generator located between the gas turbine and steam turbine; and means for conducting exhaust gas from the gas turbine to the heat recovery steam generator to generate steam for the steam turbine.

6 Claims, 1 Drawing Sheet

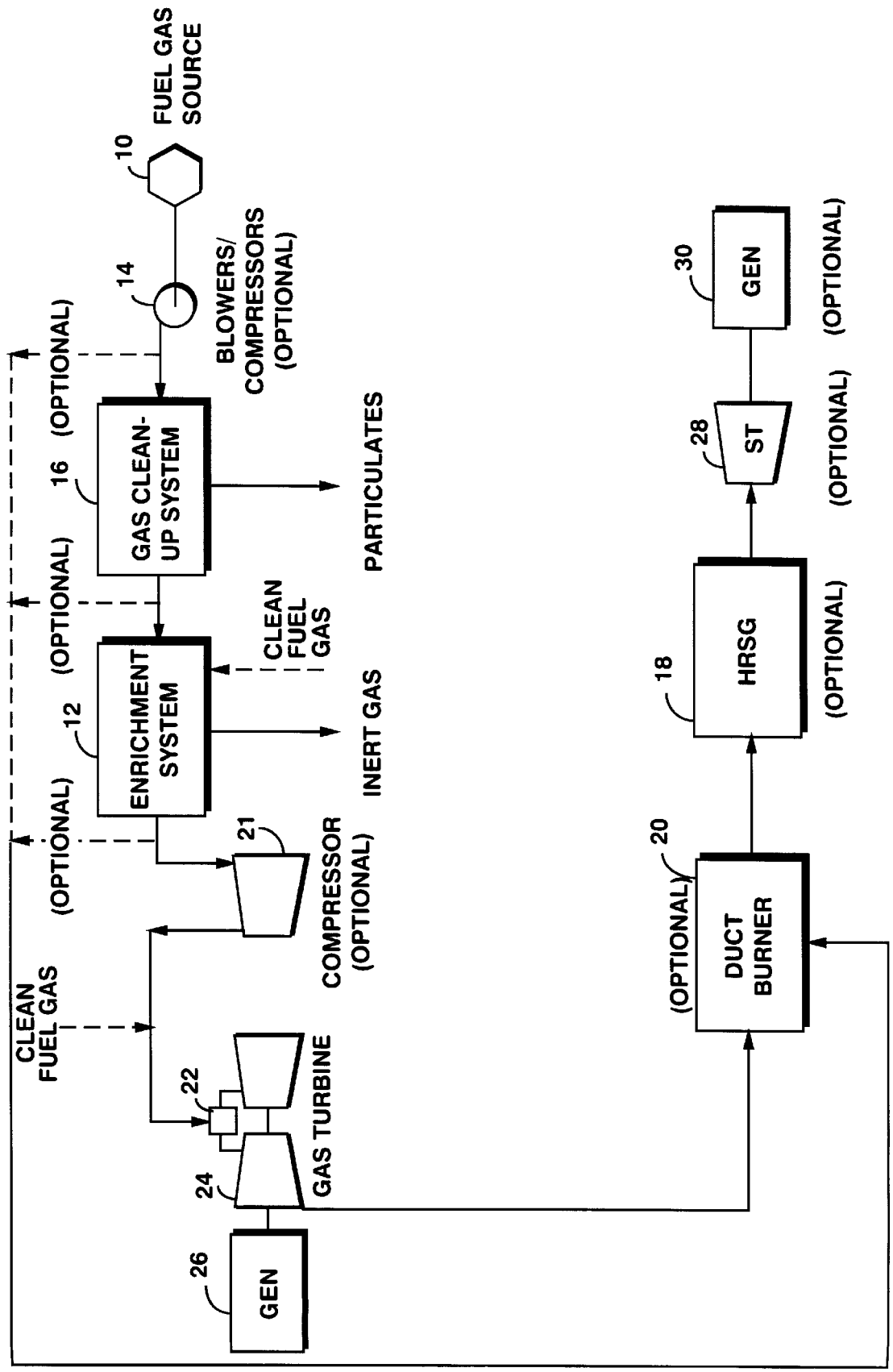

REMOVAL OF INERT GASES FROM PROCESS GASES PRIOR TO COMPRESSION IN A GAS TURBINE OR COMBINED CYCLE POWER PLANT

This is a divisional of application Ser. No. 08/932,885, filed Sep. 17, 1997, now pending.

TECHNICAL FIELD

This invention relates to fuel systems for gas turbine or combined cycle power plants and, more particularly, to a system where process gases used to fuel the gas turbine combustor are subjected to an initial clean-up system for the removal of inert gases.

BACKGROUND

Fuels used in gas turbines are typically hydrocarbons in the form of oil, or natural gas. The fuel to be used in any particular stationary plant is generally determined by economics and fuel availability. Industrial processes often create combustible by-product streams. Examples include sugar mill refuse; petroleum coke from oil refineries; steel mill blast furnace gases; sawmill wastes and so on, which also can be converted into gas turbine fuels. All fuels can be characterized by a heating value in terms of BTU's per pound. The heating value may be defined as the energy available in the products of combustion when being cooled back to a reference temperature, and typically runs about 18,500 BTU's per pound for a light fuel oil.

The form and quality of the by-product fuels available from industrial processes varies and may require further processing to be suitable for use in a gas turbine. For example, petroleum coke or refinery bottoms can be gasified to produce a mixture of CO and $H_2$ suitable for a gas turbine while allowing environmentally harmful contaminants (e.g., sulfur) to be removed. Even gaseous by-product fuels such as blast furnace gas need to be compressed to meet the needs of a gas turbine.

DISCLOSURE OF THE INVENTION

The present invention relates to the enrichment of by-product fuel gas such as blast furnace gas from a steel mill for combustion in a gas turbine, or gas turbine combined cycle plant. Even more specifically, the present invention relates to the removal of inert gases such as $CO_2$ from the by-product gas prior to, or part-way through, compression for combustion in a gas turbine or gas turbine combined cycle plant for fuel heating value enrichment, compression power reduction, and possibly gas clean-up system size reduction if located upstream. Thus, in addition to the usual gas clean-up system which removes dust, ash, sulfur, etc. from the process gas prior to introduction into the gas turbine combustion system, the present invention utilizes another clean-up system, located downstream or upstream of the conventionally located clean-up system, for the purpose of inert gas removal. The specific inert gas removal technique may be any of several commercially available systems. By removing inert gas from the by-product fuel gas, the heating value and flammability characteristics of the by-product fuel gas are significantly improved. Conventional practice has been to blend natural gas with the by-product gas to increase its heating value (enrich) and improve combustion characteristics.

Accordingly, in a first exemplary embodiment of the invention, the invention relates to a method of operating a gas turbine wherein by-product process gases are used as fuel in the gas turbine, an improvement comprising the steps of:

a) removing inert gases from the process gas;

b) raising the process gas to a minimum pressure if required; and c) feeding the process gas to the gas turbine combustor.

In another aspect, the invention relates to a gas turbine or gas turbine combined cycle plant including one or more gas turbines, a supply of process gas to be used as fuel in the gas turbine(s); a gas enrichment station for removing inert gas from the process gas prior to or part-way through fuel gas compression; a gas clean-up station located upstream or downstream of the gas enrichment station; optionally, a heat recovery steam generator fed by the gas turbine exhaust to generate steam for a steam turbine; means for conducting exhaust gas from the gas turbine to the heat recovery steam generator, and a steam turbine. The bottoming portion of the gas turbine combined cycle may optionally employ a working fluid other than steam, such as the Kalina cycle using a mixture of $NH_3$ and $H_2O$.

Other objects and advantages of the subject invention will become apparent from the detailed description which follows.

BRIEF DESCRIPTION OF THE DRAWING

The single drawing FIGURE illustrates the invention in schematic block diagram form.

BEST MODE FOR CARRYING OUT THE INVENTION

In the exemplary embodiment, and with reference to the single drawing FIGURE, hot process gases from a fuel gas source 10 are boosted by one or more blowers 14 to a higher pressure (this is the start of fuel gas compression) as required for passage through the conventionally oriented gas clean-up system at 16 (and, ultimately, for combustion in the gas turbine). Here, dust, ash and the like (referred to herein as "particulates") are removed in the usual manner. Some process gases may be diverted to a heat recovery steam generator (HRSG) 18 after combustion in a burner 20 supplied with gas before or after the gas clean-up station 16. Because the gases in the HRSG 18 do not require the same level of clean-up as the gas turbine combustion fuel gas, they need not pass through the clean-up system or station 16. Moreover, if required for combustion stability, the HRSG burner fuel stream may alternatively be diverted after the enrichment station 12.

After the particulates have been removed at the clean-up station 16, the remaining process gases are transmitted to the enrichment station 12 where inert gases ($CO_2$ in the example) are removed by a conventional technique. Optionally, additional clean fuel gas may be added here, as indicated by the dotted lines in the Figure. Conventional systems for removing inert gases are commercially available from Dow Chemical (GAS/SPEC Specialty Amines); Union Carbide (SELEXOL) and Benfield (Hot Carbonate).

Process gases cleaned at station 16 and enriched at station 12 are introduced into the combustion system 22 of the gas turbine 24, which, in turn, drives the generator 26. These gases may, if necessary, be further boosted after the enrichment station 12 via optional compressor 21 to a minimum pressure suitable for the gas turbine combustion system. Moreover, clean fuel gas from another source may also be added between the compressor 21 and the gas turbine combustion system 22. Exhaust gases from the gas turbine combustion could be utilized in the HRSG 18 (where they merge with gases from the burner 20, if present) to generate steam for the steam turbine 28 which drives a second generator 30.

By removing inert gases, especially $CO_2$ in the exemplary embodiment, the Heating Value of the gas can be raised approximately 38%. Inert gas removal also results in compression power reduction and a possible reduction in the size requirements for the conventional clean-up system at 16 if located upstream of this system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of enriching by-product process gases from a blast furnace for use as fuel in a combustor of a gas turbine comprising the steps of:

a) removing inert gases from the process gas to thereby create an enriched process gas having a predetermined heating value for combustion in said gas turbine;

b) before or after step a), removing particulates from said process gas;

c) raising the enriched process gas to a minimum predetermined pressure required for gas turbine combustion; and, following step c);

d) feeding the enriched process gas at said minimum predetermined pressure directly to the gas turbine combustor;

wherein the gas turbine is part of a combined cycle power plant including one or more heat recovery steam generators and one or more steam turbines; and wherein some portion of the enriched process gas is diverted to the heat recovery steam generator prior to step d).

2. The method of claim 1 wherein the inert gases removed include $CO_2$.

3. The method of claim 1 wherein step c) is carried out with the aid of one or more blowers.

4. The method of claim 1 wherein exhaust gases from the gas turbine are used to generate steam in the heat recovery steam generator for the one or more steam turbines.

5. The method of claim 4 wherein process fuel gases diverted to the heat recovery steam generator are burned with remaining exhaust gases from the gas turbine in the heat recovery steam generator.

6. The improvement of claim 5 wherein the inert gases removed include $CO_2$.

* * * * *